United States Patent
Fischer et al.

(10) Patent No.: US 9,321,260 B2
(45) Date of Patent: Apr. 26, 2016

(54) METHOD FOR CREATING A PRINTED IMAGE COMPOSED OF SECTIONS

(71) Applicant: HEIDELBERGER DRUCKMASCHINEN AG, Heidelberg (DE)

(72) Inventors: Joerg-Achim Fischer, Laboe (DE); Berthold Giess, Eckernfoerde (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/262,951

(22) Filed: Apr. 28, 2014

(65) Prior Publication Data

US 2014/0320561 A1 Oct. 30, 2014

(30) Foreign Application Priority Data

Apr. 26, 2013 (DE) .......................... 10 2013 007 294

(51) Int. Cl.
  *B41J 29/38* (2006.01)
  *B41J 2/07* (2006.01)
  *B41J 2/21* (2006.01)
  *B41J 25/00* (2006.01)

(52) U.S. Cl.
  CPC *B41J 2/07* (2013.01); *B41J 2/2132* (2013.01); *B41J 2/2146* (2013.01); *B41J 25/001* (2013.01); *B41J 2202/21* (2013.01)

(58) Field of Classification Search
  CPC .. B41J 2/0458; B41J 2/04541; B41J 2/04543; B41J 2/04581; B41J 2/04573

USPC ........................................................... 347/12
See application file for complete search history.

(56) References Cited

U.S. PATENT DOCUMENTS

| 8,550,589 | B2 | 10/2013 | Mizutani |
| 2002/0057309 | A1* | 5/2002 | Ikemoto et al. ................. 347/42 |
| 2004/0218200 | A1* | 11/2004 | Ebihara .......................... 358/1.9 |
| 2010/0007898 | A1 | 1/2010 | Bane et al. |
| 2012/0013919 | A1* | 1/2012 | Helterline et al. ............. 358/1.6 |

FOREIGN PATENT DOCUMENTS

| EP | 0034060 A1 | 8/1981 |
| EP | 1452313 A1 | 9/2004 |
| EP | 2284009 A1 | 2/2011 |

* cited by examiner

*Primary Examiner* — Manish S Shah
*Assistant Examiner* — Yaovi Ameh
(74) *Attorney, Agent, or Firm* — Laurence A. Greenberg; Werner H. Stemer; Ralph E. Locher

(57) ABSTRACT

A method for creating a printed image with sections on an object using at least two inkjet print heads, includes forming the image of first and second image sections, in a y direction at a fixed angle different than 0° and 180° relative to an object conveying direction, printing print dots of the first and second sections using first and second heads having first and second inkjet nozzles with the sections partially overlapping in a region and potentially forming a light or dark line, defining first and second complementary nozzle fields of the first and second heads to be active for each column of dots in the y direction, and placing a joint between the fields in the overlap region in a light or dark area of the column for each column of dots, avoiding potentially disruptive light or dark lines at the joint and keeping the image without defect.

12 Claims, 7 Drawing Sheets

- Preparation
- Provision
- Segmentation
- Definition of absolute minima
- Generating correction data records

METHOD FOR CREATING A PRINTED IMAGE COMPOSED OF SECTIONS

CROSS-REFERENCE TO RELATED APPLICATION

This application claims the priority, under 35 U.S.C. §119, of German Patent Application DE 10 2013 007 294.8, filed Apr. 26, 2013; the prior application is herewith incorporated by reference in its entirety.

BACKGROUND OF THE INVENTION

Field of the Invention

The present invention relates to a method for creating a printed image composed of sections on an object to be printed by using at least two inkjet print heads, which includes forming the printed image having a first printed image section and a second printed image section in a y direction extending at a fixed angle different than 0° and 180° relative to a conveying direction of the object, and printing print dots of the first section using a first print head having first inkjet nozzles and printing print dots of the second section using a second print head having second inkjet nozzles, with the two sections partially overlapping in a region of overlap and potentially forming a light or dark line.

The invention belongs to the technical field of inkjet printing.

If inkjet heads are used to print on printing materials or objects that are wider than the printing width of the respective heads, it is necessary to use multiple heads and to stitch them, i.e. to position and control them in such a way that the printed strips created by print dots of the individual heads are joined to form a seamless printed image. Errors that may occur in that process are referred to as stitching errors and include visible light or dark lines resulting from gaps or overlap between the print dots. In particular, in halftone images such lines are visible flaws, especially the light lines, which are visible both in full-tone and half-tone areas and, in particular, in dark areas of the printed image. In full-tone areas, dark lines are less visible, but they will be in halftone areas. Such errors need to be avoided. For that purpose, the heads are positioned as accurately as possible at the beginning. It is also possible to provide continuous mechanical position correction for the heads, for example by closed-loop control. However, such a procedure is complex and may fail at high production speeds. In order to make the location of the joint between the two printing strips invisible to the human eye, it is known to continuously vary the position of the stitching location, for example in accordance with a function or stochastically. However, such variation may also have an undesired visual effect that disrupts the printed image.

SUMMARY OF THE INVENTION

It is accordingly an object of the invention to provide a method for creating a printed image composed of sections, which overcomes the hereinafore-mentioned disadvantages of the heretofore-known methods of this general type and which allows printed strips of adjacent inkjet heads to be joined in such a way that the joint is invisible to the human eye.

With the foregoing and other objects in view there is provided, in accordance with the invention, a method for generating a printed image composed of sections on an object to be printed on by at least two inkjet print heads, which comprises, in a y direction extending at a fixed angle different than 0° and 180° relative to the conveying direction of the object, forming the printed image of a first printed image section and a second printed image section, providing a first print head having first inkjet nozzles printing print dots of the first section and a second print head having second inkjet nozzles printing print dots of the second section, the two sections partially overlapping in a region of overlap and potentially forming a light or dark line for each of the columns of print dots extending in the y direction, and defining a first field of printing inkjet nozzles of the first print head and a complementary second field, joined to the first field, of printing inkjet nozzles of the second print head for each of the columns of print dots extending in the y direction, with the joint between the two fields in the region of overlap being placed in a light or dark area of the column for each of the columns of print dots extending in the y direction.

An advantage of the method of the invention is that it allows printed strips of adjacent inkjet heads to be joined in such a way that the joint is no longer visible to the human eye.

In short, the invention is based on the concept of shifting a (potential) light line at the joint between two print heads into light areas of the printed image, causing the line to "disappear" to the human eye. In a corresponding way, a (potentially) dark line may be shifted to dark areas or converted to a light line by mechanically adjusting a head in the y direction or by shifting the image data of a head in the y direction (by a respective line width of a line of print dots).

In accordance with the invention, the joint between the print strips is not varied stochastically or randomly. Instead, it is varied on the basis of an analysis of the available image data in the region of the overlap between the two inkjet print heads. For each column, the joint is shifted to an uncritical area, i.e. to an area in which the joint is invisible to the human eye. A potential white line is preferably divided in the x direction, and the parts thereof are shifted in the y direction into light or even white areas. The division may preferably be made for each individual column of print dots.

The method of the invention uses the image data of the image to be printed, i.e. no preliminary tests involving test data are necessary.

In accordance with a further aspect, a two-dimensional Fourier transform of the corrected print data may be used to evaluate whether or not the correction results in detrimental, i.e. visible local frequencies. If this is the case, the correction may be overruled and a modified correction may be applied, for example by at least partially selecting other minima than the ones that had previously been selected.

Alternative or additional steps may include:
1) Avoiding two selected minima in two successive columns being at the same level (at the same y value). If this is the case, a different minimum will be selected in the second of the two columns, preferably the second smallest minimum.
2) In the space of the minima (data record MinS) the minima are selected in accordance with a predefined function such as a sine function ($y=a*\sin(b*x)$).
3) In the space of the minima (data record MinS), the minima are selected stochastically.
4) The joint locations are not placed at the locations of the absolute minima, i.e. not in the lightest areas, but in the largest possible continuous light areas even if they may be less light.

In accordance with another preferred mode of the method of the invention, as mentioned above, for each or at least for most of the columns of print dots extending in the y direction, the joint is placed in the absolute lightest or darkest area of the column or in the largest continuous light or dark area of the column.

In accordance with a further preferred mode of the method of the invention, in order to determine the absolute lightest or darkest area of the column or the largest continuous light or dark area of the column, an analysis is made of the image data of the printed image, in particular in the region of the overlap.

In accordance with an added preferred mode of the method of the invention, in order to determine the absolute lightest or darkest area of the column or the largest continuous light or dark area of the column, a segmentation process is carried out.

In accordance with an additional preferred mode of the method of the invention, in order to avoid the emergence of visible local frequencies and/or other visible defects, for some columns of print dots, the joint between the two fields in the region of overlap is placed in the second or third lightest or darkest area of the column or in the second or third largest continuous light or dark area of the column.

In accordance with yet another preferred mode of the method of the invention, the light or dark areas of successive columns are selected in accordance with a predefined function, in particular a sine function.

In accordance with yet a further preferred mode of the method of the invention, the light or dark areas of successive columns are selected in a stochastic process.

In accordance with yet an added preferred mode of the method of the invention, in full-tone areas of the printed image, the joint between the two fields in the region of overlap is positioned stochastically.

In accordance with yet an additional preferred mode of the method of the invention, the method is carried out iteratively until no more visible defects are present. This means that a provision may be made for a printed image that has been analyzed and corrected (in terms of stitching) in accordance with the invention to be iteratively subjected to one or more further analyses and corrections to further improve the result.

In accordance with again another preferred mode of the method of the invention, if multicolor printed images are to be printed, the method is carried out for each color separation separately and an evaluation is made to find out whether or not visible defects occur when the printed images are superposed. Thus, in multicolor printing, for example four-color printing using the known CMYK printing inks, it is determined whether or not the superposition of the corrected printed images (the individual color separations) results in visible defects. If this is the case, such potential errors may be eliminated by modifying the correction in the individual color separations.

With the objects of the invention in view, there is concomitantly provided a method for generating a composite printed image in which two sections partially overlap in a region of overlap, which comprises placing a light joint location in a light area or placing a dark joint location in a dark area.

Any combinations between the invention described above as it is defined by the main claim and the advantageous further developments of the invention described above also form advantageous further developments.

The scope of the invention also includes a machine processing printing substrates, for instance a printing press or a printer for printing on flat or curved objects such as sheets, webs, or packages, that is technically equipped to carry out the afore-described method of the invention, i.e. it includes inkjet heads, for example, and a control.

In accordance with alternative methods, a provision may be made for packaging plants or filling systems to be equipped with a device that is technically equipped to carry out the afore-described method of the invention, i.e. it includes inkjet heads and a control, and prints on the packages or containers to be filled such as bottles, in accordance with the present invention.

Other features which are considered as characteristic for the invention are set forth in the appended claims.

Although the invention is illustrated and described herein as embodied in a method for creating a printed image composed of sections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
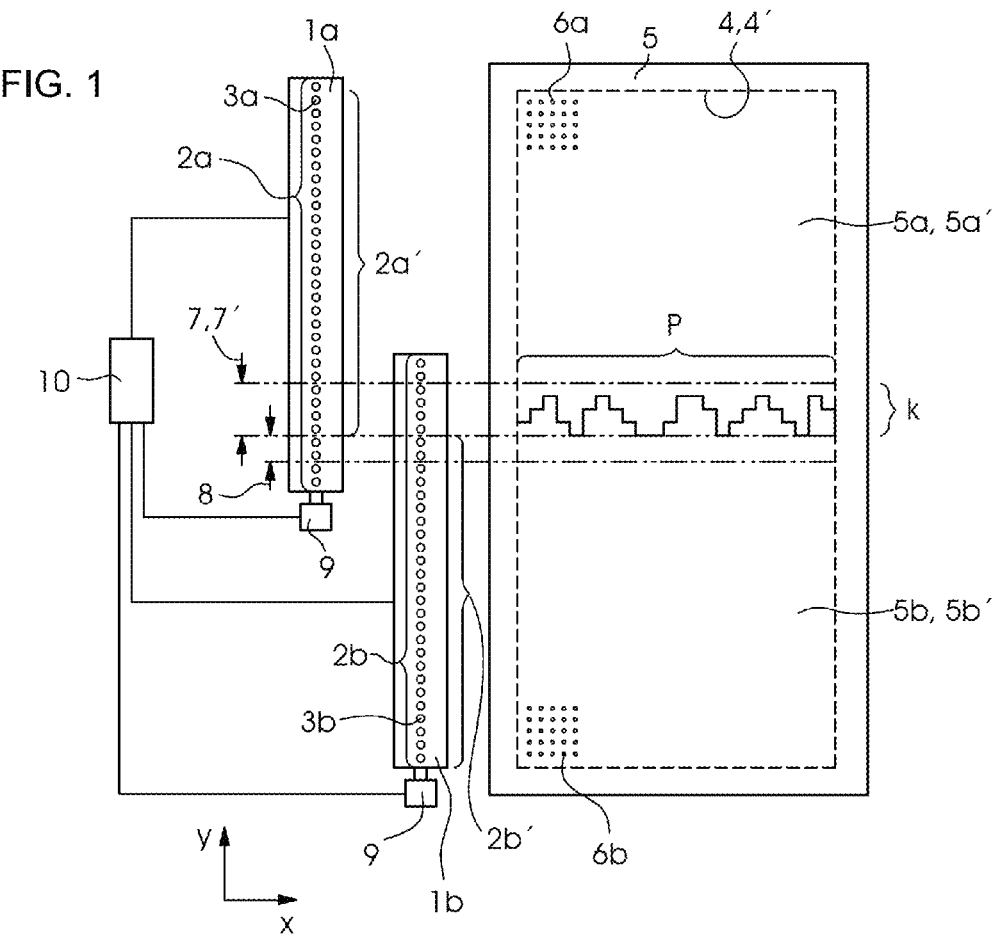
FIG. 1 is a diagrammatic, top-plan view of a preferred exemplary embodiment of a device for carrying out the method of the invention.

Referring now to the figures of the drawings in detail and first, particularly, to FIG. 1 thereof, there is seen a first inkjet head 1a and a second inkjet head 1b (each of which is referred to as a "head" in the following description) with fields 2a, 2b of inkjet nozzles 3a, 3b. The number of nozzles per head and the number of corresponding print dots in the y direction is referred to as N. The heads (i.e. the print dots thereof) create a printed image 4 on an object 5 to be printed, preferably a flat, substantially two-dimensional printing substrate (such as paper, cardboard, sheets or a web of foil) or on a three-dimensional body (such as a plastic/glass bottle, a plastic/cardboard container). The printed image has a first section 5a including print dots 6a and a second section 5b including print dots 6b, as seen in the y direction. Each of the print dots may be allocated to a respective head. The print dots may be composed of small pixels created by individual inkjet droplets. FIG. 1 indicates the conveying direction x of the object and the y direction that is at a fixed angle relative to the conveying direction x, in which the angle is different than 0° and 180°. The heads are disposed parallel to the y direction. In the illustrated example, the angle is approximately 90°. However, it may be approximately 45° or approximately 135°, for example. FIG. 1 further indicates that the two heads and thus the sections 5a and 5b they create partially overlap in a region of overlap 7 (also referred to as a stitching zone). Reference symbol k represents the number of nozzles of each head in the region of overlap, i.e. the number of corresponding print dots in the y direction. Reference symbol p represents the number of print dots (e.g. of the printed image) in the x direction.

Thus, the region of overlap has k*p print dots, i.e. k lines and p columns (k in the y direction and p in the x direction). The heads (or at least one of the two heads) may be mechanically adjusted in the y direction and their positions relative to each other may be changed. This fact is indicated by a mechanical correction zone 8. Correspondingly, at least one actuator 9 is provided for the adjustment. A data record 4' that contains the image data to be printed, for instance in the form of a so-called bitmap, corresponds to the printed image. Likewise, a data record 5a' corresponds to the first section, a data record 5b' corresponds to the second section, and a data record 7' corresponds to the region of overlap. The latter record has a size k*p corresponding to the region of overlap. The two heads are each connected to a control, controller or computer 10. The actuator(s) is/are likewise connected to the control.

Figure 2:
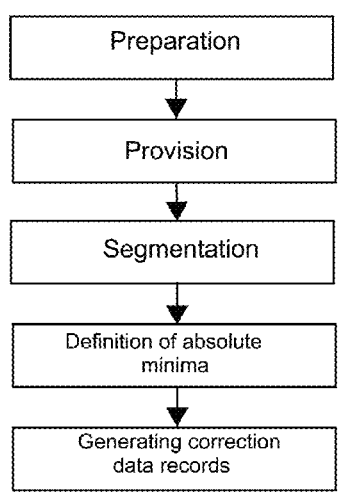
FIG. 2 is a flow chart of a preferred exemplary embodiment of the method of the invention.

FIG. 2 is a flow chart of a case in which an undesired white line is present.

In a step 100 (preparation) a mechanical adjustment of the heads 1a and 1b is made to reduce the potential gap (light line) or the potential overlap (dark line) to such an extent that its width, i.e. the residual error after the mechanical correction, is smaller than a line width (line of successive print dots in the x direction). Preferably, the correction may always be made in such a way that the residual error results in a light line. In the example described herein, it will therefore be assumed that a light line is present. The case of a dark line may be treated in a corresponding way. For this preparatory process step, it may be expedient to print a test pattern (in an iterative way), to scan the test pattern by a camera and to evaluate it by using a computer to detect and reduce light or dark lines.

In a step 101 (provision) the k (i.e. i=1 to k) line data of all columns p (i.e. j=1 to p) are provided. The provision step may be carried out by uploading the data from a first memory into a second, working memory. The data may be provided as gray values (e.g. 0 to g). Thus, 0 means "do not print a dot" (i.e. 0% ink), g means "print a dot" (i.e. 100% ink).

In a step 102 (segmentation) a segmentation of the i=1 to k line data for each column j=1 to p is carried out: the gray values of each column j may be jointly regarded as a gray value progression and the segmentation of this progression leads to a set Sp of minima in the progression. When no minimum is found for a column j, for example because there is a full-tone line, the minimum is defined in a location i, for example by a random selection of i.

In a step 103 (definition of absolute minima) an absolute minimum $S_{min}$ for each column j is selected from a set $S_p$. When multiple absolute minima of the same gray value are selected, the absolute minimum $S_{min}$ that is closest to the white line is selected. The white line is located at i=1 in the x or p direction. When absolute minima are selected at the same locations i in two successive columns, a different minimum, preferably the second smallest minimum in the set $S_p$, is selected in the second one of the two columns. Then a data record MinS is generated that has the size k*p and contains all the absolute minima $S_{min}$ defined before.

In a step 104 (generating correction data records), two correction data records are generated with the aid of the data record MinS: one data record for the first head 1a and one data record for the second head 1b. The first correction data record contains the image data to be printed by the first head 1a for the region of overlap 7. The second correction data record contains the complementary (and thus adjoining) image data to be printed by the second head 1b for region of overlap 7. For each column j of the correction data records, the print dots from i=1 to the i value of the absolute minimum $S_{min}$ selected for the column j are printed by nozzles of the first head 1a (first field of printing nozzles 2a') and the remaining print dots from the i value of the selected absolute minimum $S_{min+1}$ to i=k are printed by the second head 1b (second field of printing nozzles 2b'). The image data are provided in the correction data records in a corresponding way.

Thus, in accordance with the invention, for each of the columns of print dots extending in the y direction the joint between the two fields in the region of the overlap is placed in a light or dark area of the column. This means that if without a complete correction in accordance with the invention or after step 100, i.e. potentially, a continuous light line might be discernible in the x direction, the location of the joint is placed in a light area to reduce its visibility. A dark line is treated in a corresponding way: either it is converted into a light line according to step 100 and placed in light areas or it remains a dark line and is placed in dark areas.

Figure 3A:
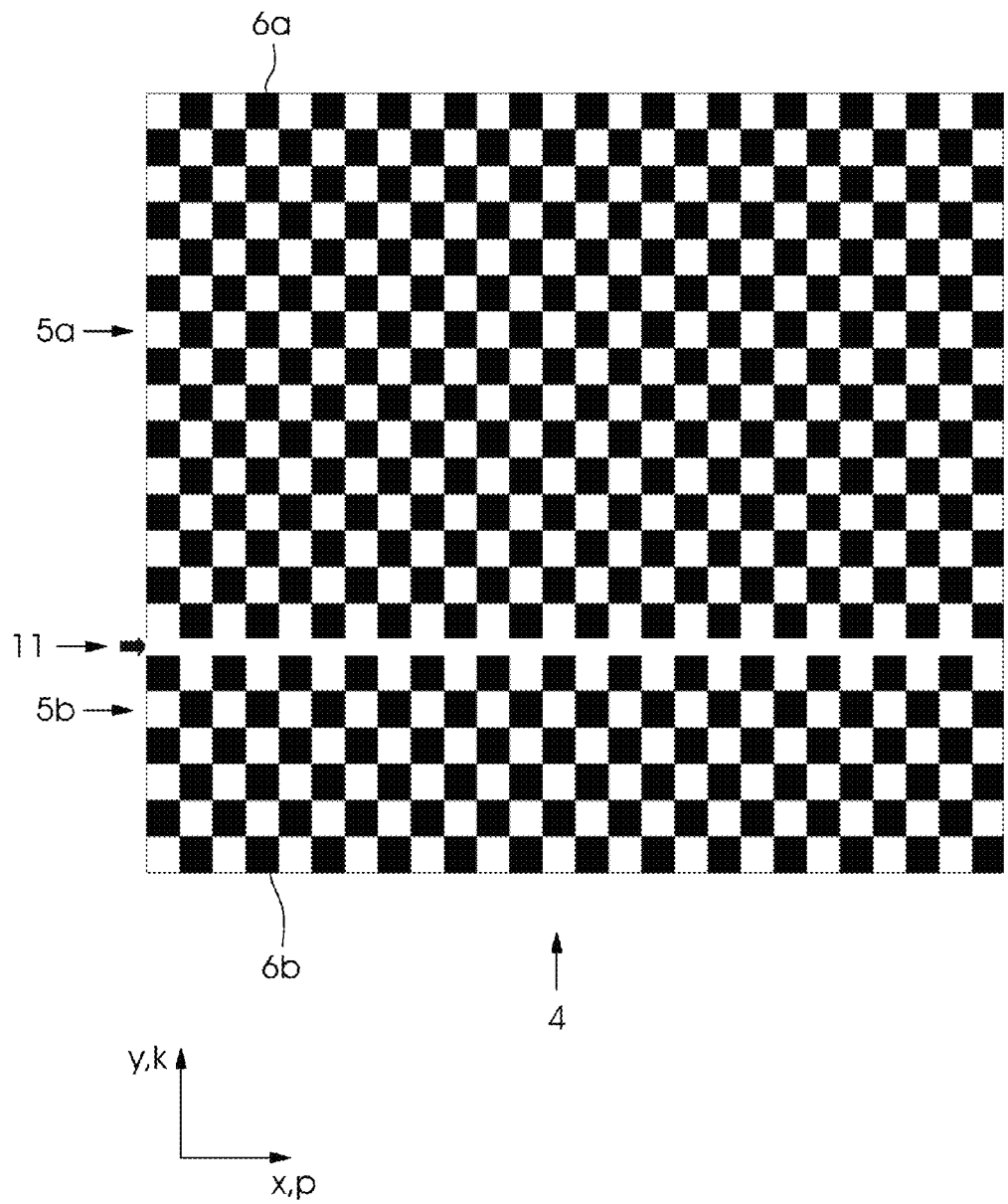
FIGS. 3a-3c illustrate a printed image with a visible stitching location and with a stitching location that has been modified in accordance with the invention and is consequently not visible.

FIG. 3a is an enlarged view of a halftone printed image 4 (prior to a correction according to the invention) formed of print dots 6a and 6b (diagrammatically shown as black squares) and composed of two sections 5a and 5b. The print dots form columns p and lines k. The two sections form a joint 11 that is visible in the printed image as a light line. The figure also shows that the width of the joint location in the y direction is less than the width of a print dot due to the positioning of the print heads (carried out in step 100).

Figure 3B:
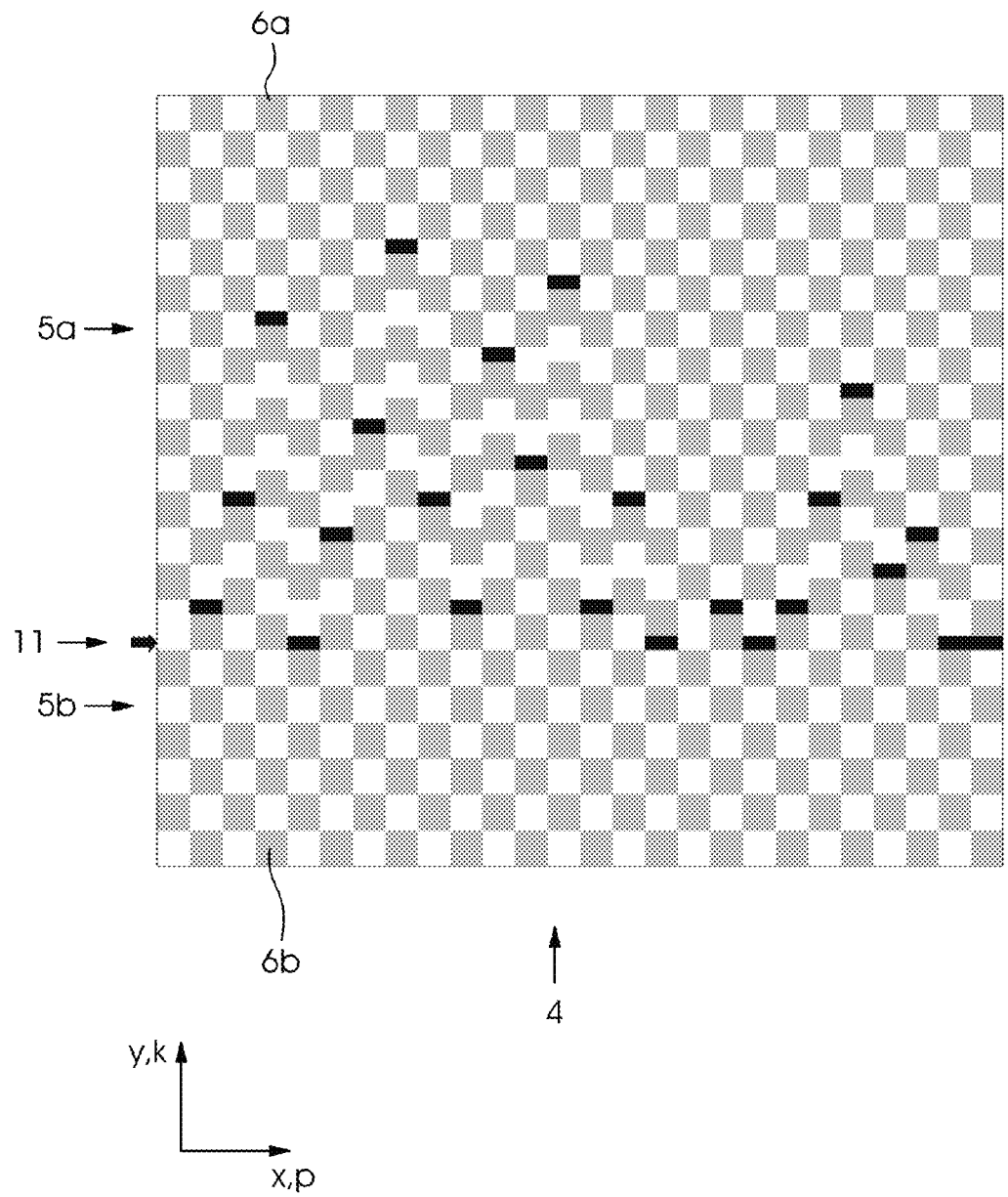

FIG. 3b illustrates the printed image 4 after the potential light line of the joint 11 has been divided in accordance with steps 101 to 104 and after the individual parts (diagrammatically indicated by black rectangles) have been distributed across the printed image. In order to improve visibility, the line and the parts thereof are represented in black and the further print dots are gray. In the chess-board-like screen chosen in this case for reasons of clarity, the method of the invention is not completely recognizable because there are no larger continuous light areas into which the parts may be addressed. That is to say, all light areas are of equal size (namely the size of precisely one cell). The method of the invention is more clearly visible in FIGS. 4a to 4c.

Figure 3C:
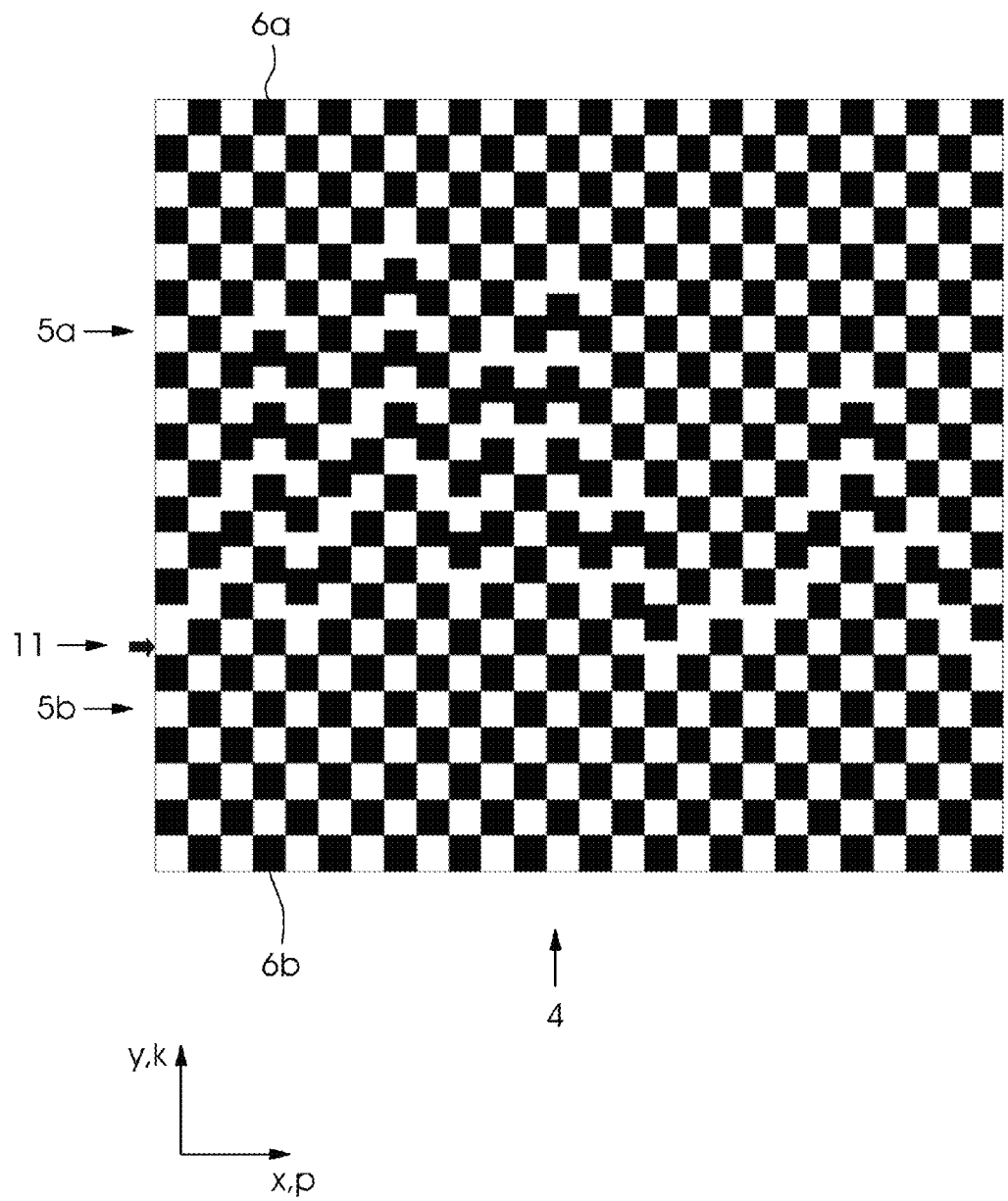

FIG. 3c illustrates the same printed image 4 with the parts of the potential light line no longer represented as a dark line. It is apparent that the visibility of the potential light line to the human eye is reduced. Now the advantage of the invention is clearly visible.

Figure 4A:
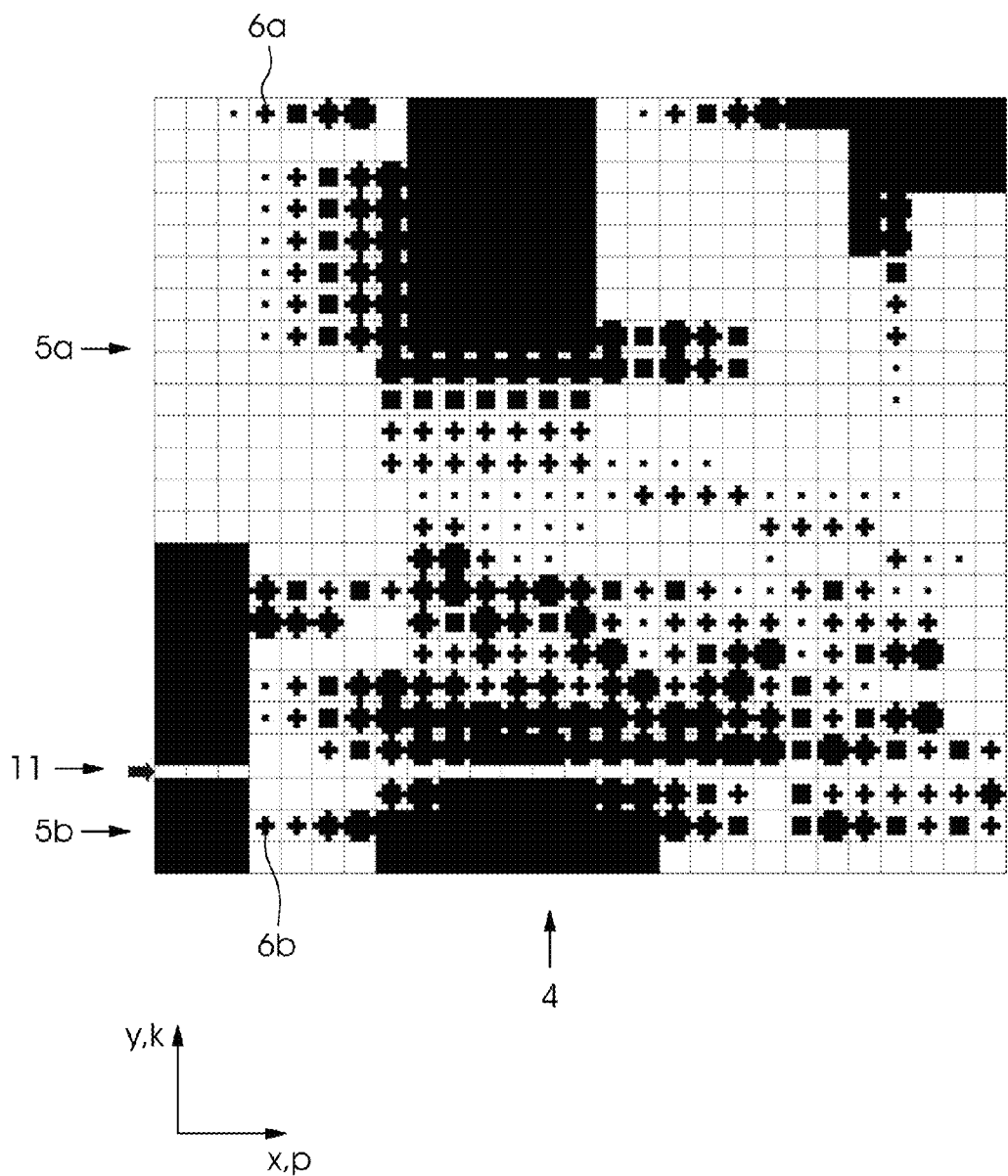
FIGS. 4a-4c illustrate a printed image with a visible stitching location and with a stitching location that has been modified in accordance with the invention and is consequently not visible.

FIG. 4a (comparable to FIG. 3a) is an enlarged view of a halftone printed image 4 (before a correction in accordance with the invention) formed of print dots 6a and 6b (diagrammatically shown as black units) and composed of two sections 5a and 5b. The individual print dots may be composed of different numbers of pixels. The print dots form columns p and lines k. The two sections form a joint 11 that is visible in the printed image as a light line. It is also apparent that the width of the joint in the y direction is smaller than the width of a printed dot as a result of the positioning of the print heads (carried out in step 100).

Figure 4B:
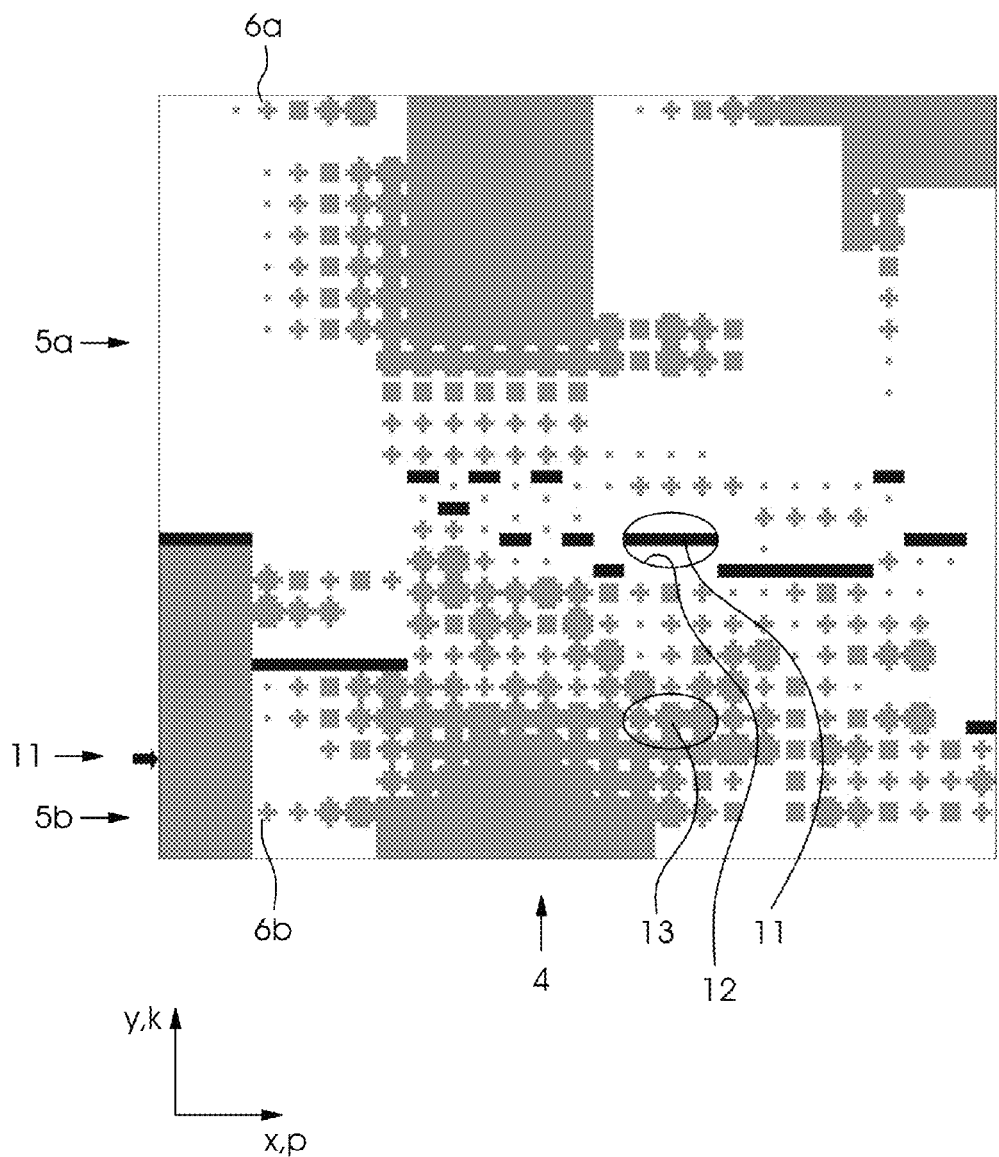

FIG. 4b illustrates the printed image 4 after the potential light line of the joint 11 has been divided in accordance with steps 101 to 104 and after the individual parts (diagrammatically indicated by black rectangles) have been distributed across the printed image. In order to improve visibility, the line and the parts thereof are represented in black and the further print dots are gray. The figure clearly shows that the black rectangles are addressed into light areas of the printed image. In contrast, a stochastic addressing might be disadvantageous in that the parts of the potential light line might be placed in dark areas, e.g. in the large dark area at the upper edge of the printed image. In these locations, parts of the light line would be clearly visible to the human eye and would be detrimental to the printed image. By way of example, a light area 12 and a dark area 13 are highlighted in FIG. 4*b*. In an advantageous way, the joints 11 of the potential light line have been visibly placed in a light area and not in a dark area.

Figure 4C:
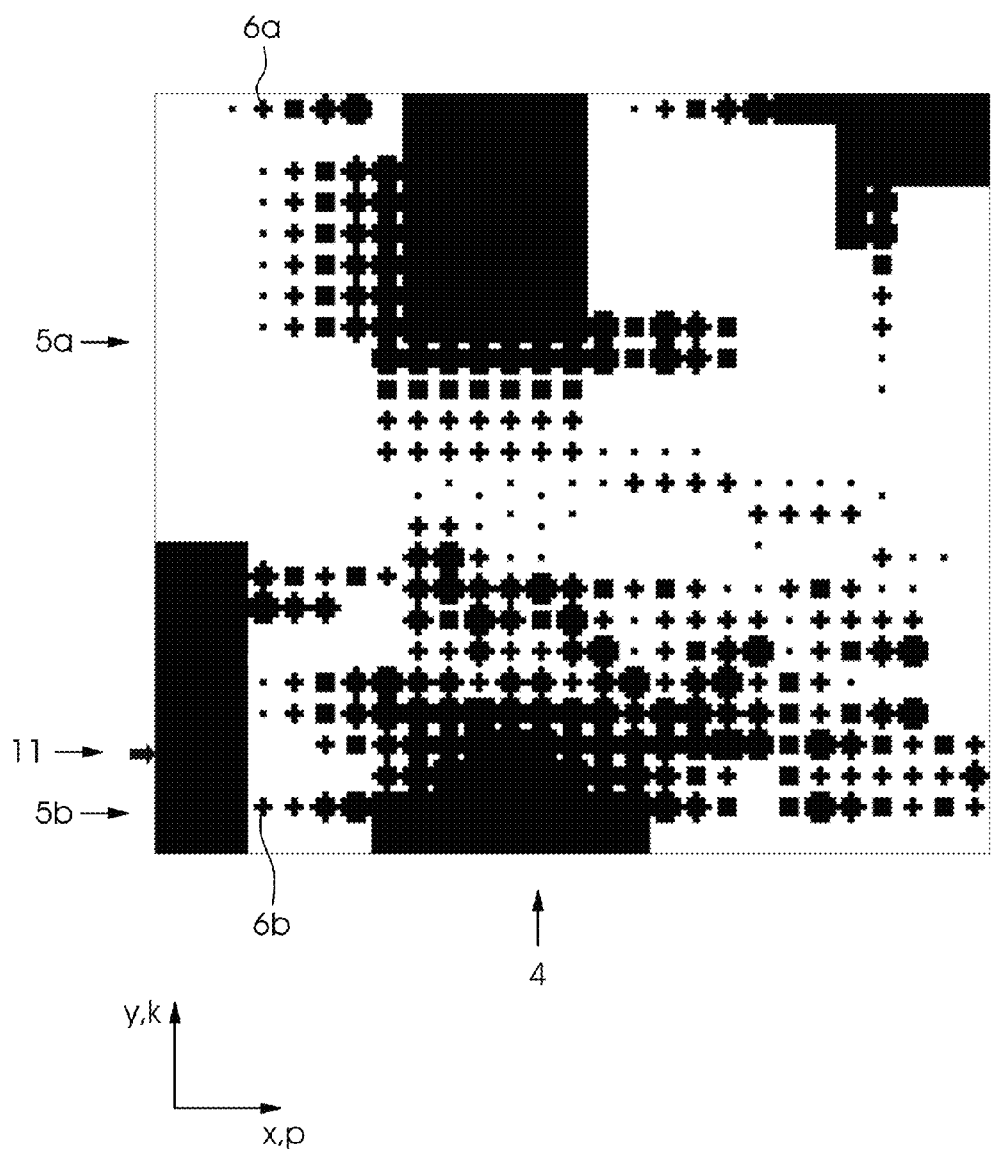

FIG. 4*c* (comparable to FIG. 3*c*) shows the same printed image with the parts of the potential light line no longer represented as a dark line. It is apparent that the visibility of the potential light line to the human eye is reduced. Like in FIG. 3*c*, the advantage of the invention is clearly visible.

The invention claimed is:

1. A method for creating a printed image composed of sections on an object to be printed by using at least two inkjet print heads, the method comprising the following steps:
   forming the printed image having a first printed image section and a second printed image section in a y direction extending at a fixed angle different than 0° and 180° relative to a conveying x direction of the object;
   printing print dots of the first section using a first print head having first inkjet nozzles and printing print dots of the second section using a second print head having second inkjet nozzles, with the two sections partially overlapping in a region of overlap and potentially forming a light or dark line;
   defining a first field of printing inkjet nozzles of the first print head and a complementary second field, adjacent the first field, of printing inkjet nozzles of the second print head, for each of the columns of print dots extending in the y direction; and
   i) for each of the columns of print dots extending in the y direction, determining a presence of a light area of the column without print dots and placing a joint between the two fields in the region of the overlap in the light area of the column without print dots, to reduce a visibility of a potential light line being otherwise continuous in the x direction, or
   ii) for each of the columns of print dots extending in the y direction, determining a presence of a dark area of the column with print dots and placing a joint between the two fields in the region of the overlap in the dark area of the column with print dots, to reduce a visibility of a potential dark line being otherwise continuous in the x direction.

2. The method according to claim 1, which further comprises placing the joint in the absolute lightest or darkest area of the column or in the largest continuous light or dark area of the column, for each or at least for most of the columns of print dots extending in the y direction.

3. The method according to claim 2, which further comprises determining the absolute lightest or darkest area of the column or the largest continuous light or dark area of the column by carrying out an analysis of the image data of the printed image.

4. The method according to claim 3, which further comprises carrying out the analysis of the image data of the printed image in the region of overlap.

5. The method according to claim 3, which further comprises carrying out segmentation to determine the absolute lightest or darkest area of the column or the largest continuous light or dark area of the column.

6. The method according to claim 2, which further comprises placing the joint between the two fields in the second or third lightest or darkest area of the column or in the second or third largest continuous light or dark area of the column in the region of overlap, to avoid a creation of at least one of visible local frequencies or other visible defects, for some columns of print dots.

7. The method according to claim 3, which further comprises selecting the light or dark areas of successive columns in accordance with a predefined function.

8. The method according to claim 7, wherein the predefined function is a sine function.

9. The method according to claim 3, which further comprises selecting the light or dark areas of successive columns in a stochastic way.

10. The method according to claim 1, which further comprises positioning the joint between the two fields in the region of overlap in a stochastic way in full-tone areas of the printed image.

11. The method according to claim 1, which further comprises carrying out the method iteratively until no more visible defects are present.

12. The method according to claim 1, which further comprises carrying out the method separately for each color separation and performing an inspection to determine if any visible defects are created by superposition of the printed images, when printing multicolor printed images.

* * * * *